(12) United States Patent
Babin et al.

(10) Patent No.: US 12,190,541 B2
(45) Date of Patent: Jan. 7, 2025

(54) AUTOMATED VEHICLE POSE VALIDATION

(71) Applicant: Argo AI, LLC, Pittsburgh, PA (US)

(72) Inventors: Philippe Babin, Pittsburgh, PA (US);
Kunal Anil Desai, San Francisco, CA (US); Tao V. Fu, Pittsburgh, PA (US); Gang Pan, Fremont, CA (US); Xxx Xinjilefu, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 0 days.

(21) Appl. No.: 18/513,247

(22) Filed: Nov. 17, 2023

(65) Prior Publication Data

US 2024/0087163 A1     Mar. 14, 2024

Related U.S. Application Data

(63) Continuation of application No. 17/541,094, filed on Dec. 2, 2021, now Pat. No. 11,861,865.

(51) Int. Cl.
*G01S 17/89* (2020.01)
*B60W 60/00* (2020.01)
(Continued)

(52) U.S. Cl.
CPC ............ *G06T 7/74* (2017.01); *B60W 60/001* (2020.02); *G01S 7/4808* (2013.01); *G01S 17/89* (2013.01);
(Continued)

(58) Field of Classification Search
CPC ............ G06T 7/74; G06T 2207/10028; G06T 2207/30252; G06T 2207/20076;
(Continued)

(56) References Cited

U.S. PATENT DOCUMENTS 9,098,773 B2    8/2015    Huang et al.
9,489,575 B1    11/2016    Whalen et al.
(Continued)

FOREIGN PATENT DOCUMENTS

EP     3349146 A1    7/2018
EP     3396408 A1    10/2018
(Continued)

OTHER PUBLICATIONS

International Search Report and Written Opinion of the International Searching Authority directed to related International Patent Application No. PCT/US2022/080734, mailed Dec. 1, 2022; 8 pages.

(Continued)

*Primary Examiner* — Rodney A Butler
(74) *Attorney, Agent, or Firm* — Sterne, Kessler, Goldstein & Fox P.L.L.C.

(57) ABSTRACT

Disclosed herein are system, method, and computer program product embodiments for automated autonomous vehicle pose validation. An embodiment operates by generating a range image from a point cloud solution comprising a pose estimate for an autonomous vehicle. The embodiment queries the range image for predicted ranges and predicted class labels corresponding to lidar beams projected into the range image. The embodiment generates a vector of features from the range image. The embodiment compares a plurality of values to the vector of features using a binary classifier. The embodiment validates the autonomous vehicle pose based on the comparison of the plurality of values to the vector of features using the binary classifier.

17 Claims, 15 Drawing Sheets

(51) Int. Cl.
*G01S 7/48* (2006.01)
*G06T 7/73* (2017.01)

(52) U.S. Cl.
CPC ............... *B60W 2420/408* (2024.01); *G06T 2207/10028* (2013.01); *G06T 2207/30252* (2013.01)

(58) Field of Classification Search
CPC ........... B60W 60/001; B60W 2420/408; G01S 7/4808; G01S 17/89; G01S 7/4802; G01S 17/42; G01S 17/86
See application file for complete search history.

(56) References Cited

U.S. PATENT DOCUMENTS

| | | |
|---|---|---|
| 9,514,378 B2 | 12/2016 | Armstrong-Crews et al. |
| 10,024,664 B1 | 7/2018 | Gill et al. |
| 10,054,678 B2 | 8/2018 | Mei et al. |
| 10,220,766 B2 | 3/2019 | Soehner et al. |
| 10,416,679 B2 | 9/2019 | Lipson et al. |
| 10,445,599 B1 | 10/2019 | Hicks |
| 2017/0248693 A1 | 8/2017 | Kim |
| 2018/0157269 A1 | 6/2018 | Prasad et al. |
| 2018/0276912 A1 | 9/2018 | Zhou |
| 2018/0284779 A1 | 10/2018 | Nix |
| 2018/0299534 A1 | 10/2018 | LaChapelle et al. |
| 2019/0129009 A1 | 5/2019 | Eichenholz et al. |
| 2019/0339708 A1* | 11/2019 | Ramirez Llanos ...... B60D 1/36 |
| 2020/0159244 A1 | 5/2020 | Chen et al. |
| 2020/0301015 A1 | 9/2020 | Siddiqui et al. |
| 2021/0278523 A1* | 9/2021 | Urtasun ................ G01S 13/865 |
| 2021/0365712 A1* | 11/2021 | Lu ......................... G01S 7/4802 |
| 2022/0122324 A1* | 4/2022 | Jian ....................... G06T 17/205 |
| 2023/0177719 A1 | 6/2023 | Babin et al. |

FOREIGN PATENT DOCUMENTS

| | | |
|---|---|---|
| KR | 20110080025 A | 7/2011 |
| WO | 2008018906 A2 | 2/2008 |
| WO | 2010027795 A1 | 3/2010 |

OTHER PUBLICATIONS

Fazekas, A. et al., "Performance Metrics and Validation Methods for Vehicle Position Estimators", IEEE Transactions on Intelligent Transportation Systems, Jul. 31, 2020, vol. 21, No. 7.

* cited by examiner

AUTOMATED VEHICLE POSE VALIDATION

CROSS-REFERENCE TO RELATED APPLICATIONS

This is a Continuation application of U.S. application Ser. No. 17/541,094, filed on Dec. 2, 2021, which is incorporated by reference in its entirety.

BACKGROUND

Once fully integrated onto roadways, autonomous vehicles are expected to revolutionize public transportation and infrastructure. Autonomous vehicle systems present several advantages. For example, with the increase of autonomous vehicles, the number of traffic fatalities are expected to fall drastically. Correlatively, with decreased traffic fatalities, traffic infrastructure may experience less traffic congestion and a significant decrease in harmful emissions. Autonomous vehicles are also expected to transform daily life in society. With driverless vehicles, society may experience an increase in productivity and people can put their time to use in other activities they would otherwise expend traveling or commuting. Autonomous vehicles are expected to save the workforce near eighty billion hours lost to commuting. As another advantage, autonomous vehicles are expected to increase traffic efficiency. Autonomous vehicles would be able to travel efficiently at optimized distances from each other using point cloud processing, lidar sensors, and/or cameras to generate optimal navigation routes.

Though there has been significant progress in developing autonomous vehicle technology, there remain several challenges in creating an autonomous vehicle system that can fully self-drive. Many features of autonomous vehicle technology still require human input or control. For example, an autonomous vehicle localizes its position and orientation in the world prior to navigating traffic, otherwise known as autonomous vehicle pose. Legacy autonomous vehicle systems have used point cloud processing techniques to register an autonomous vehicle pose. However, human operators may still need to validate the solution produced from legacy autonomous vehicle systems, as a supplemental precautionary measure to autonomous vehicle validation. But autonomous vehicle pose solutions may contain false positives, which a human operator validating the pose solution may not recognize as a false positive and would lead to validating an inaccurate autonomous vehicle pose solution. This may lead to dangerous ramifications, such as localizing the autonomous vehicle in the wrong lane. Accordingly, systems and methods are needed to automate autonomous vehicle pose validation.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
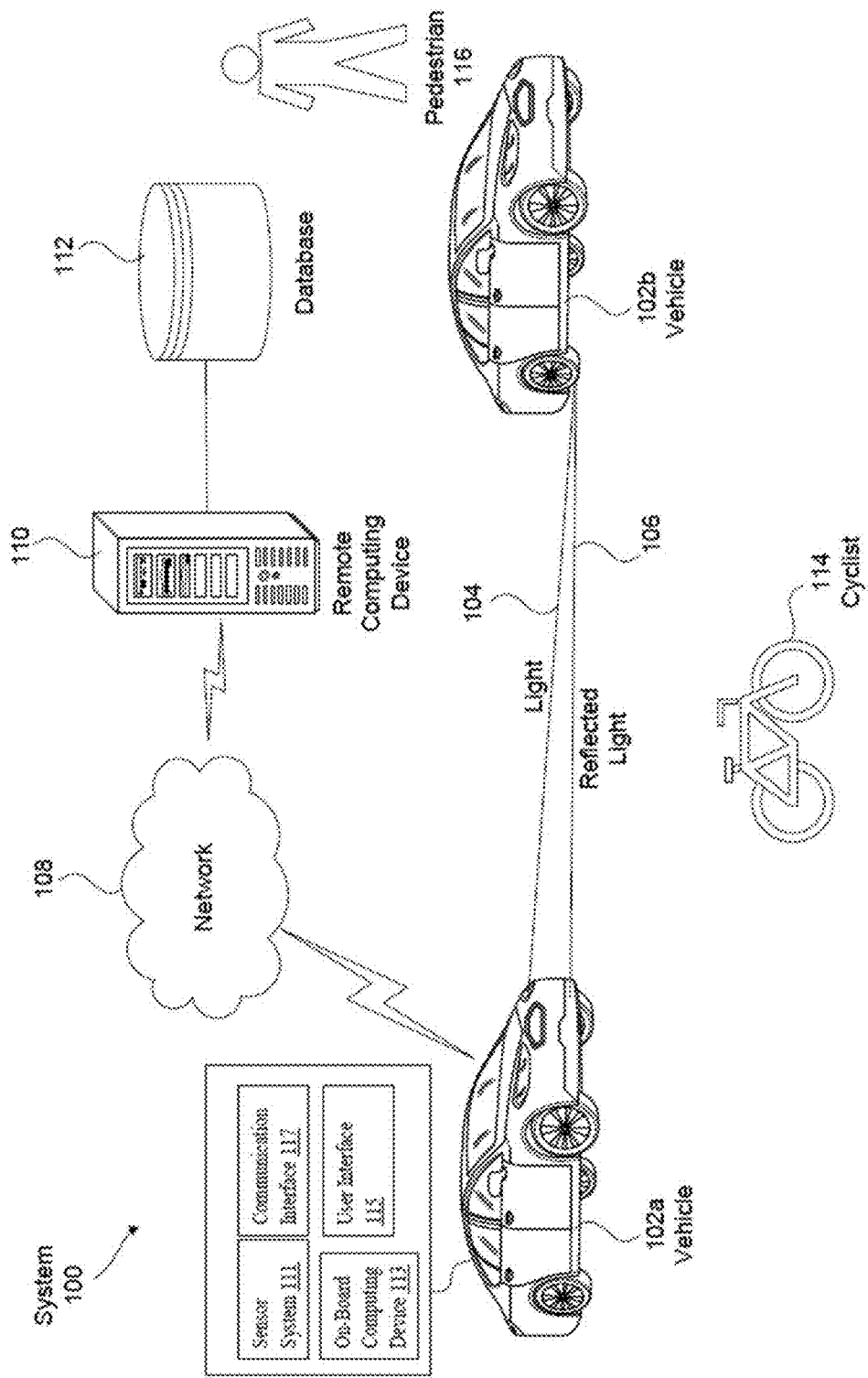
FIG. 1 illustrates an exemplary autonomous vehicle system, in accordance with aspects of the disclosure.

Provided herein are system, apparatus, device, method and/or computer program product embodiments, and/or combinations and sub-combinations thereof, for autonomous vehicle pose validation. The process for automating an autonomous vehicle typically includes several phases: sensing, map creation, localization, perception, prediction, routing, motion planning, and control modules. Localization includes the task of finding the autonomous vehicle pose relative to a position on a high-definition cloud map. Legacy autonomous vehicle systems utilize registration algorithms to localize a vehicle's position and orientation in the world prior to navigating traffic.

To determine an autonomous vehicle pose, autonomous vehicle systems may use a high definition map, in accordance with aspects of the disclosure. This high definition map is a dense 3D point cloud containing data from several lidar sweeps over time. The high definition map may also contain important semantic features representing various traffic rules. Localization is crucial because, by combining the dense 3D point cloud and semantic features, the autonomous vehicle system uses important prior information from the detailed high-definition map to derive the autonomous vehicle pose.

The high definition map, derived from a 3D point cloud stitching of several lidar sweeps over time in accordance with aspects of the disclosure, may be created offline. At runtime, an autonomous vehicle system localizes the autonomous vehicle to a particular destination in the high definition map using an initial pose estimate from GPS information. In addition to the initial pose estimate in the high definition map, the autonomous vehicle system may use real-time lidar data to localize the autonomous vehicle. Autonomous vehicle systems can be configured to combine the 3D point cloud generated from real-time lidar data with the high definition map to generate an autonomous vehicle pose solution. However, when aligning these two 3D point clouds, the autonomous vehicle system may derive an invalid autonomous vehicle pose solution containing a rotation error, a translation error, an error from various occlusions, or an inaccurate GPS initial pose estimate, etc. An error may be introduced at every step of computing the autonomous vehicle pose solution.

As a result, human operators still need to remain involved in validating autonomous vehicle pose solutions. However, this introduces human error into the localization process. For example, a human operator may inaccurately validate a false positive autonomous vehicle pose solution. This presents dangerous ramifications because the autonomous vehicle may be navigating traffic based on an incorrect position and orientation. As a result, a solution is needed to automate autonomous vehicle pose validation. This would bring the transportation industry a step closer to reaching a fully autonomous vehicle system and reducing human error from localization.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
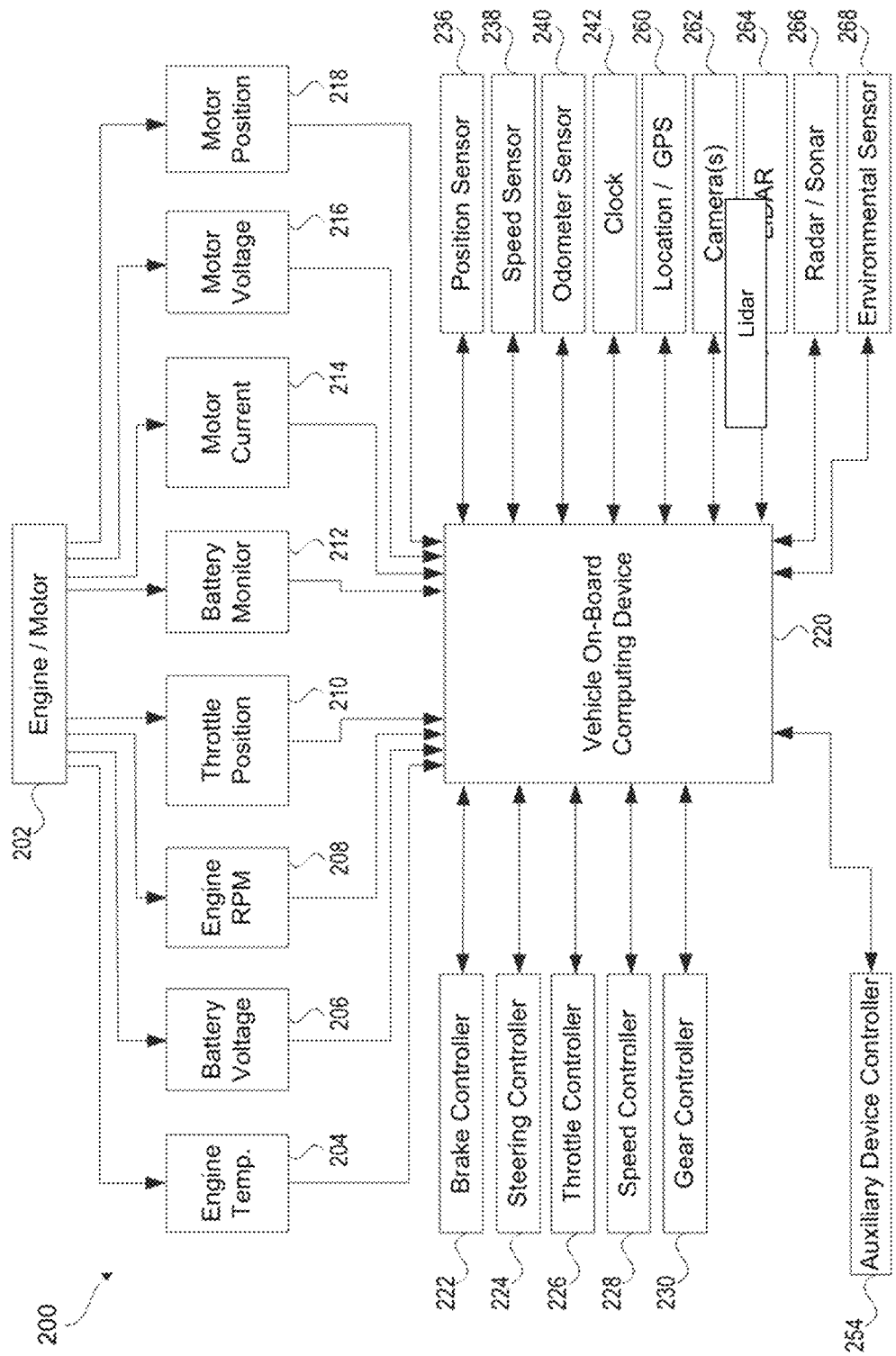
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail in association with FIG. 3, AV 102a may be configured with a lidar system 300. Lidar system 300 may include a light emitter system 304 (transmitter) that transmits a light pulse 104 to detect objects located within a distance or range of distances of AV 102a. Light pulse 104 may be incident on one or more objects (e.g., AV 102b) and be reflected back to lidar system 300. Reflected light pulse 106 incident on light detector 308 is processed by lidar system 300 to determine a distance of that object to AV 102a. Light detector 308 may, in some embodiments, contain a photodetector or array of photodetectors positioned and configured to receive the light reflected back into the system. Lidar information, such as detected object data, is communicated from lidar system 300 to an on-board computing device 220 (FIG. 2). AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

When the vehicle on-board computing device 220 detects a moving object, the vehicle on-board computing device 220 generates one or more possible object trajectories for the detected object, and analyze the possible object trajectories to assess the probability of a collision between the object and the AV. If the probability exceeds an acceptable threshold, the on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the vehicle on-board computing device 220 may cause the vehicle 200 to perform a cautious maneuver (e.g., mildly slow down, accelerate, or swerve). In contrast, if the collision cannot be avoided, then the vehicle on-board computing device 220 causes the vehicle 200 to take an emergency maneuver (e.g., brake and/or change direction of travel).

Figure 3:
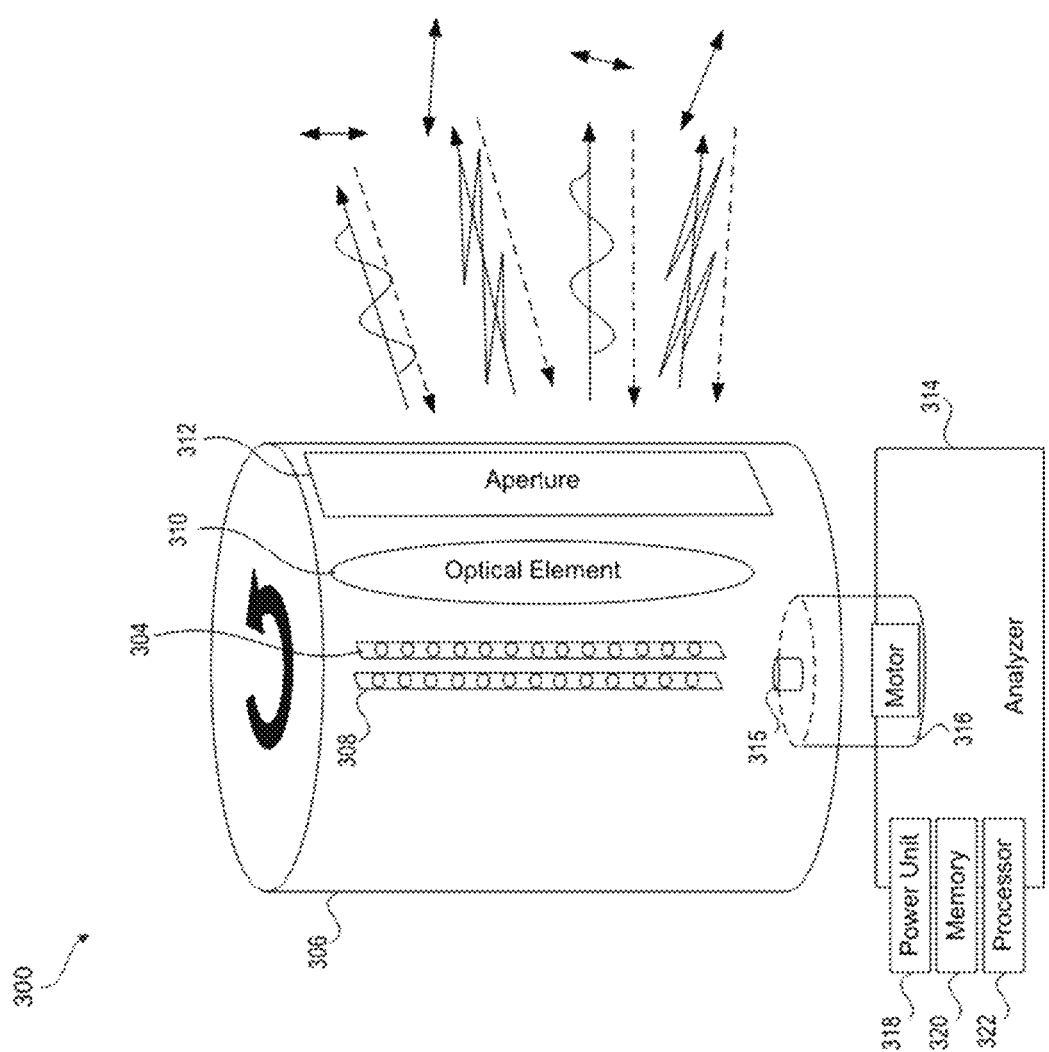
FIG. 3 illustrates an exemplary architecture for a Light Detection and Ranging ("lidar") system, in accordance with aspects of the disclosure.

FIG. 3 illustrates an exemplary architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2.

As shown in FIG. 3, the lidar system 300 includes a housing 306 which may be rotatable 3600 about a central axis such as hub or axle 315 of motor 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitter system 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4:
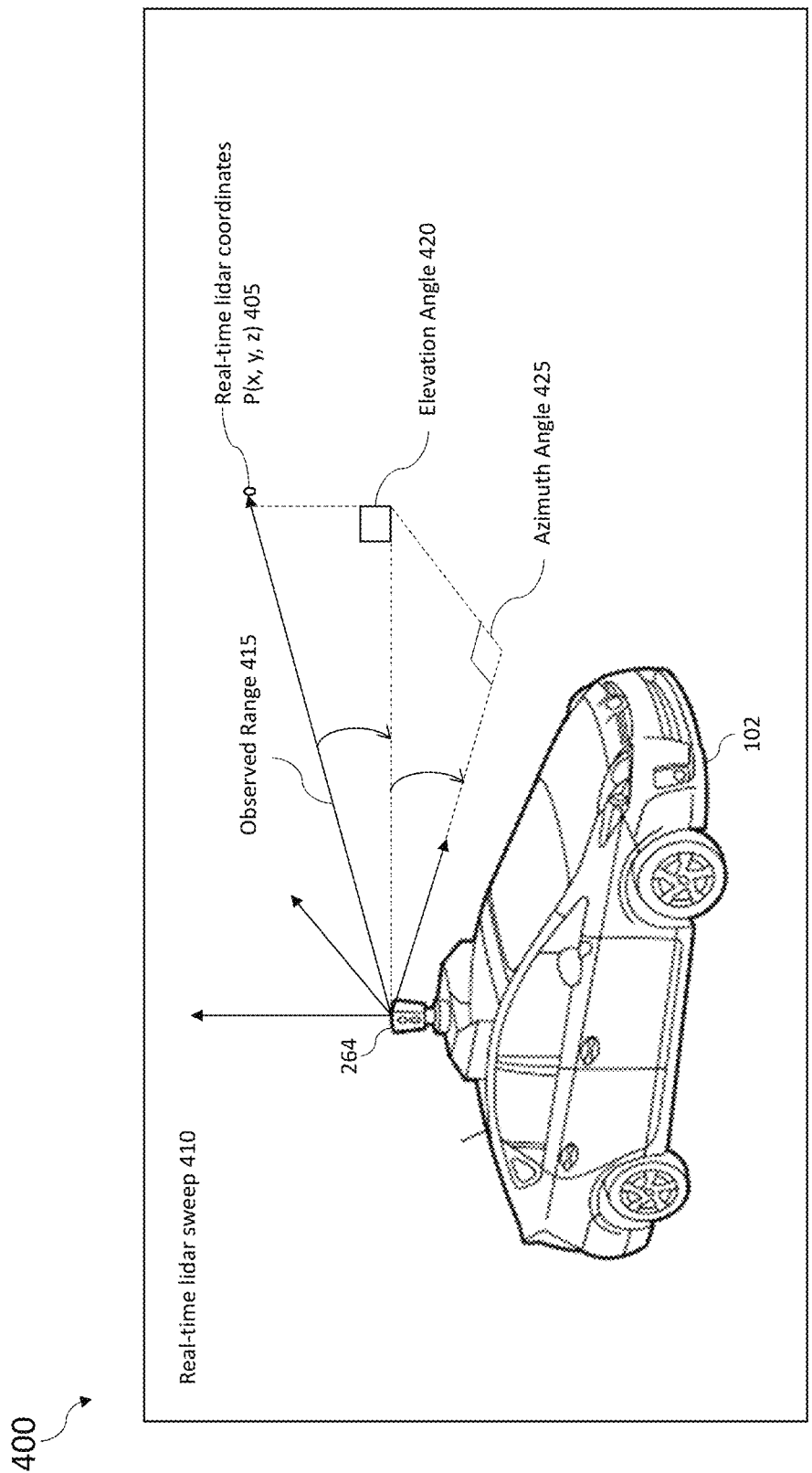
FIG. 4 illustrates an example of real-time lidar coordinates collected from a real-time lidar sweep, in accordance with aspects of the disclosure.

FIG. 4 illustrates an example of real-time lidar coordinates collected from a real-time lidar sweep, in accordance with aspects of the disclosure. FIG. 4 is described with reference to FIGS. 1-3. Localization enables vehicle on-board computing device 220 to ascertain the position and orientation of autonomous vehicle 102 in the world before navigating traffic. Lidar system 264 may scan the environment surrounding autonomous vehicle 102 to collect lidar information.

On-board computing device 220 may use real-time lidar coordinates 405 retrieved from a real-time lidar sweep 410 to localize autonomous vehicle 102. Real-time lidar coordinates 405 may consist of 3D spherical coordinates obtained from sensing the surroundings of autonomous vehicle 102, which may be represented as P(x, y, z). The 3D spherical coordinates may represent an observed range (r) 415, an elevation angle ($\varphi$) 420, and an azimuth angle ($\theta$) 425. Observed range 415 represents the range between light emitter system 304 and real-time lidar coordinates 405 retrieved during real-time lidar sweep 410. Elevation angle 420 represents the angle between the plane extending from the xy plane of lidar system 264 and real-time lidar coordinates 405.

To obtain observed range 415, light emitter system 304 may generate and emit pulses of light via one or more laser emitter chips. Analyzer 314 may comprise a stopwatch that begins counting when the pulses travel outwards from lidar system 264 towards a target object. Light detector 308 containing a photodetector may receive light reflected back into the system. Analyzer 314 may determine the observed range 415 between lidar system 264 and the target object by computing half of the distance between the speed of the pulse and time passed between when the light emitter system 304 emitted the pulse and when light detector 308 received the pulse. Moreover, analyzer 314 may determine elevation angle ($\varphi$) 420 and azimuth angle ($\theta$) 425 based upon the orientation of mirror. Using these measurements, analyzer 314 may derive real-time lidar coordinates 405 by converting the following Cartesian coordinates to 3D spherical coordinates:

$$P(x,y,z)=P(r\cos\theta\cos\varphi, r\sin\theta\cos\varphi, r\sin\varphi)$$

Lidar system 264 may communicate real-time lidar coordinates 405 and other lidar information collected from the real-time lidar sweep 410 to vehicle on-board computing device 220. On-board computing device 220 may generate a query point cloud 430 (not shown), which may be a 3D point cloud containing the real-time lidar coordinates 405 retrieved from lidar system 264 during the real-time lidar sweep 410.

Figure 5:
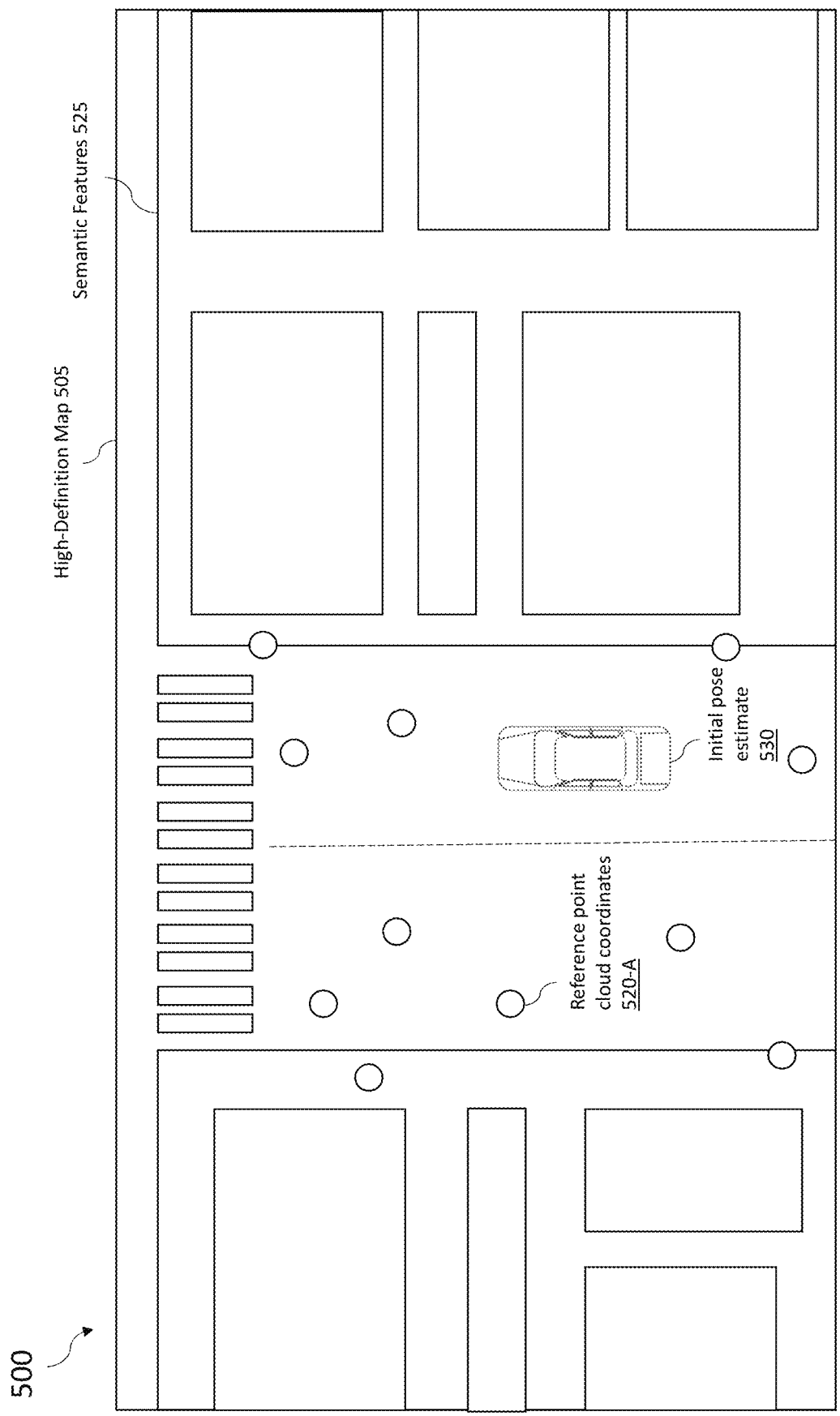
FIG. 5 illustrates an example of an initial vehicle pose estimate in a high-definition map, in accordance with aspects of the disclosure.

FIG. 5 illustrates an example of an initial vehicle pose estimate in a high-definition map, in accordance with aspects of the disclosure. FIG. 5 is described with reference to FIGS. 1-4. To localize an autonomous vehicle, vehicle on-board computing device 220 may determine the autonomous vehicle pose relative to a reference position in a high-definition map 505. High-definition map 505 may be a visual representation of a 3D environment and various semantic features representing traffic rules. High-definition map 505 may include a reference point cloud 510 containing 3D geometric information of various objects surrounding autonomous vehicle 102. High-definition map 505 may be a map comprising 3D point cloud information and other relevant information regarding a vehicle's surroundings.

Lidar system 264 may transmit to vehicle on-board computing device 220 lidar coordinates from several lidar sweeps collected from more than one autonomous vehicle 102 over time. Using 3D point cloud processing, vehicle on-board computing device 220 may generate reference point cloud 510 by aggregating data collected from multiple lidar sweeps over time. Reference point cloud 510 may contain reference point cloud coordinates 520 from previous lidar sweeps. In some embodiments, high-definition map

505 may be a previously generated offline map from which vehicle on-board computing device 220 retrieves reference point cloud coordinates 520.

High-definition map 505 may also visually depict semantic features 525 representing various traffic rules, such as, traffic lanes, traffic signs, road boundaries, etc. On-board computing device 220 may use machine learning techniques (i.e., convolutional neural networks) known to a person of ordinary skill in the art to extract various features from images from the cameras 262 and/or ground images captured from lidar system 264. The values of each pixel in the lidar ground images may include the ground height and the laser reflectivity of each lidar beam. On-board computing device 220 may then segment the lidar ground images using machine learning techniques based on the values of each pixel. On-board computing device 220 may use image segmentation machine learning techniques known to a person of ordinary skill in the art to extract labels for various features from the lidar ground images and camera images. On-board computing device 220 may project the semantic labels for the various semantic features 525 into the reference point cloud 510 of the high-definition map 505. As a result, high-definition map 505 may result in a combination of the reference point cloud 510 obtained from previous lidar sweeps and a semantic feature map containing semantic features 525.

High-definition map 505 may be an offline map, which is given a particular destination at runtime. High-definition map 505 plays an important role in providing prior information about an environment prior to the autonomous vehicle navigating traffic. The reference point cloud 510 obtained from previous lidar sweeps over time and the semantic features 525 provide an important guidepost for autonomous vehicle localization. The prior information from reference point cloud 510 may be used to register query point cloud 430 to the high-definition map 505. This enables vehicle on-board computing device 220 to localize the autonomous vehicle pose in real-time.

On-board computing device 220 may use high-definition map 505 to calibrate the autonomous vehicle pose with global precision. Accordingly, vehicle on-board computing device 220 may derive an initial pose estimate 530 relative to high-definition map 505 using GPS information. GPS device 260 may retrieve satellite data representing the global location of autonomous vehicle 102. GPS device 260 may calibrate the position and orientation of autonomous vehicle 102 to identify its initial vehicle pose estimate 530. The initial vehicle pose estimate 530 may be represented as a set of 2D or 3D coordinates. An initial vehicle pose estimate 530 represented as a set of 2D coordinates may be described, by way of non-limiting example, by the coordinates (x, y, azimuth angle (θ) 425). An initial vehicle pose estimate 530 represented as a set of 3D coordinates may be described, by way of non-limiting example, by the coordinates (x, y, z, roll angle, pitch angle, yaw angle), as described further in FIG. 6B. GPS device 260 may transmit the initial vehicle pose estimate 530 to vehicle on-board computing device 220.

On-board computing device 220 may generate the initial pose estimate 530 in high-definition map 505. On-board computing device 220 may retrieve map tiles within a specified range of the initial vehicle pose estimate 530. Each map tile surrounding the initial pose estimate 530 may include a data structure for organizing coordinates into reference point cloud 510. On-board computing device 220 may use the data stored in the data structure for each map tile into a coordinate system comprising reference point cloud coordinates 520. Using the updated high-definition map 505 with the initial pose estimate 530, vehicle on-board computing device 220 can compare the query point cloud 430 to reference point cloud 510.

FIG. 6 illustrates an example of aligning a query point cloud and reference point cloud, according to some embodiments. FIG. 6 is described with reference to FIGS. 1-5. A precise high-definition map 505 is crucial for registering query point cloud 430 in order to determine an autonomous vehicle pose. On-board computing device 220 may derive the autonomous vehicle pose from the initial pose estimate 530 in reference point cloud 510 and query point cloud 430. As discussed in FIG. 5, 3D point cloud registration enables autonomous vehicle systems to create highly precise high-definition maps useful for various stages of autonomous driving. High-definition map 505 may be built offline, and on-board computing device 220 may download relevant subsections of high-definition map 505 during runtime. On-board computing device 220 may align query point cloud 430 to high-definition map 505. However, for every new query point cloud 430 collected from a new real-time lidar sweep 410, on-board computing device 220 may need to recalculate an autonomous vehicle pose solution.

Figure 6A:
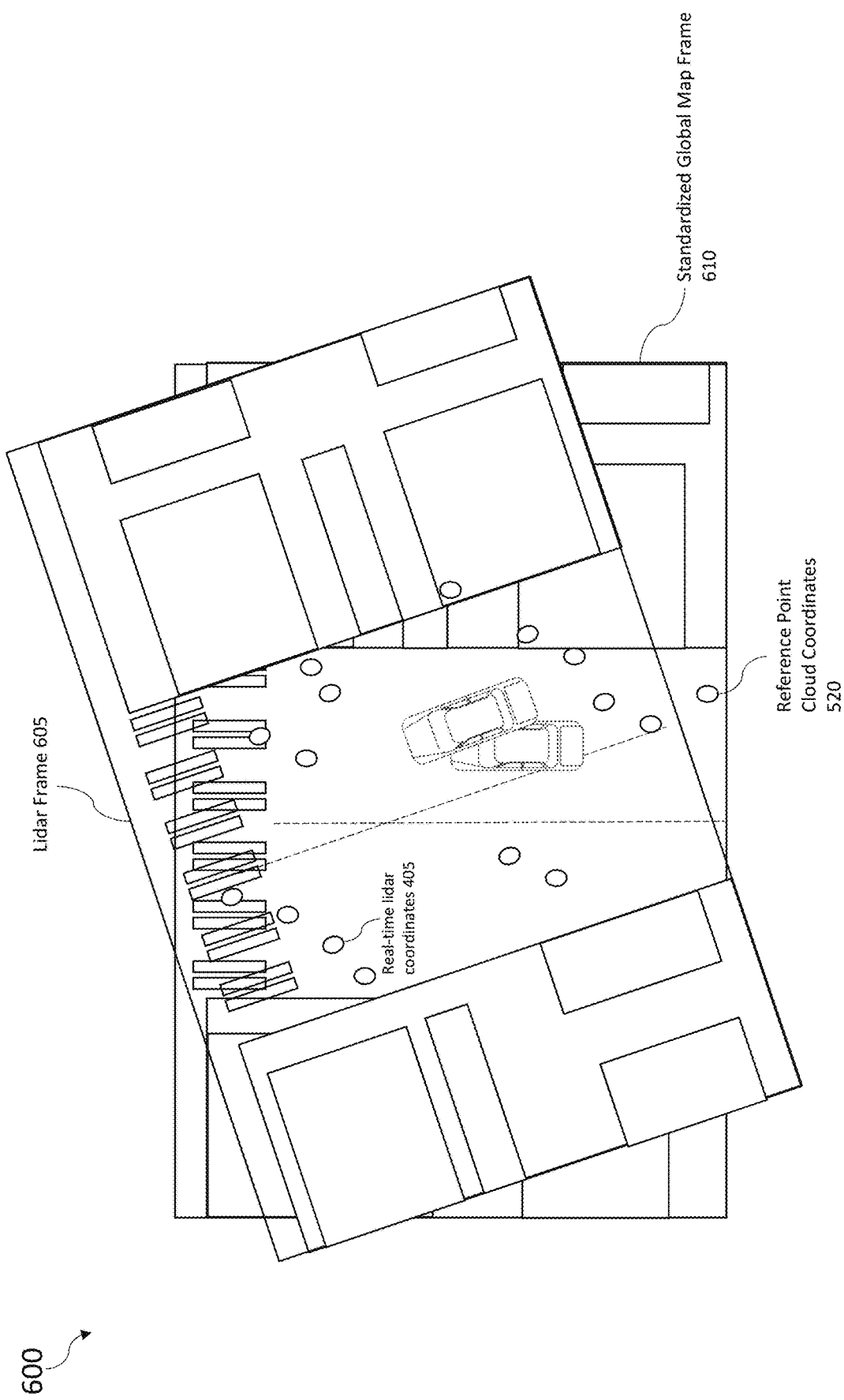
FIG. 6A illustrates an example of a misaligned query point cloud and reference point cloud, in accordance with aspects of the disclosure.
Figure 6C:
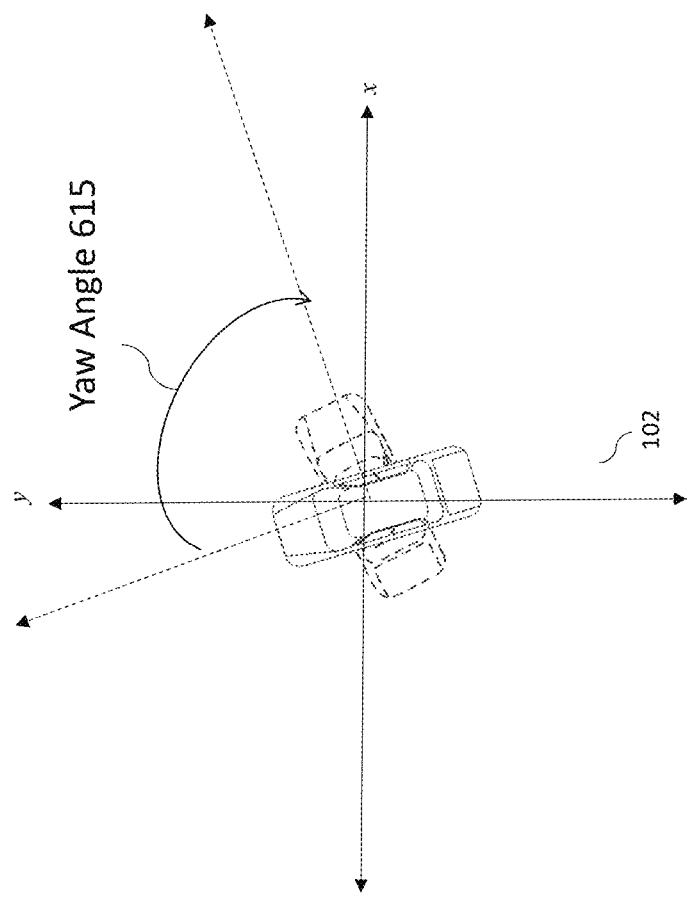
FIG. 6C illustrates an example of a misaligned query point cloud and reference point cloud from a 2D perspective, in accordance with aspects of the disclosure.

However, as shown in FIG. 6A, using the initial vehicle pose estimate 530 to align the query point cloud 430 (black coordinates) and reference point cloud 510 (white coordinates) may result in misalignment. On-board computing device may be unable to localize the pose of an autonomous vehicle until the position of the query point cloud 430 is aligned relative to high-definition map 505. To align query point cloud 430 and reference point cloud 510, vehicle on-board computing device 220 may compute a 3D rotation and 3D translation of query point cloud 430 and reference point cloud 510.

Figure 6B:
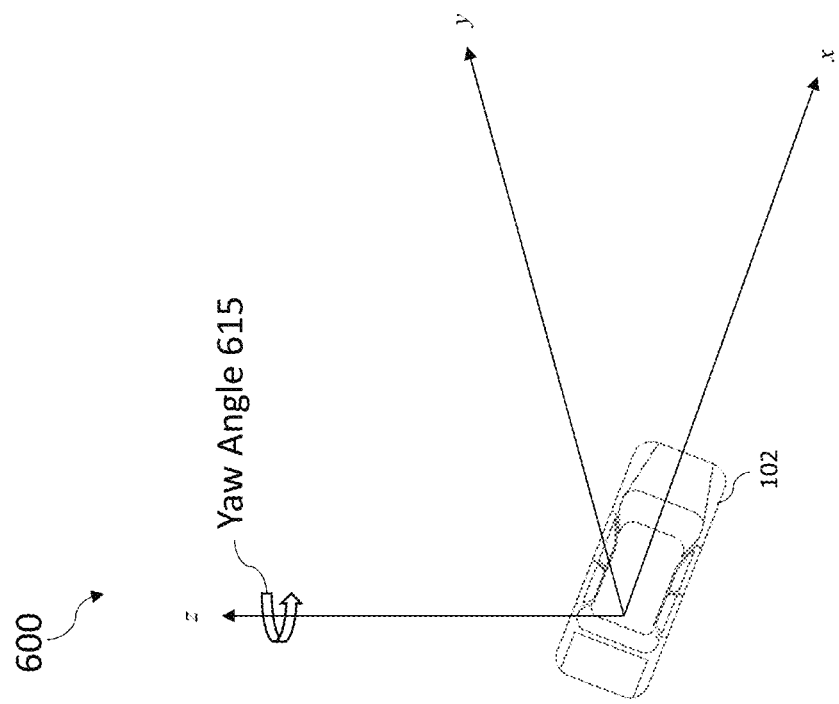
FIG. 6B illustrates an example of a 3D rotation of a query point cloud, in accordance with aspects of the disclosure.

FIG. 6B depicts a 3D rotation of autonomous vehicle 102. On-board computing device 220 may rotate query point cloud 430 to correct a rotation misalignment between query point cloud 430 and reference point cloud 510. The query point cloud 430 may be rotated about the z-axis at a yaw angle 615. In some embodiments, query point cloud 430 may be transformed, through rotation and translation, or by applying a SE(3) transformation to align the query point cloud 430 to the reference point cloud 510.

Figure 6D:
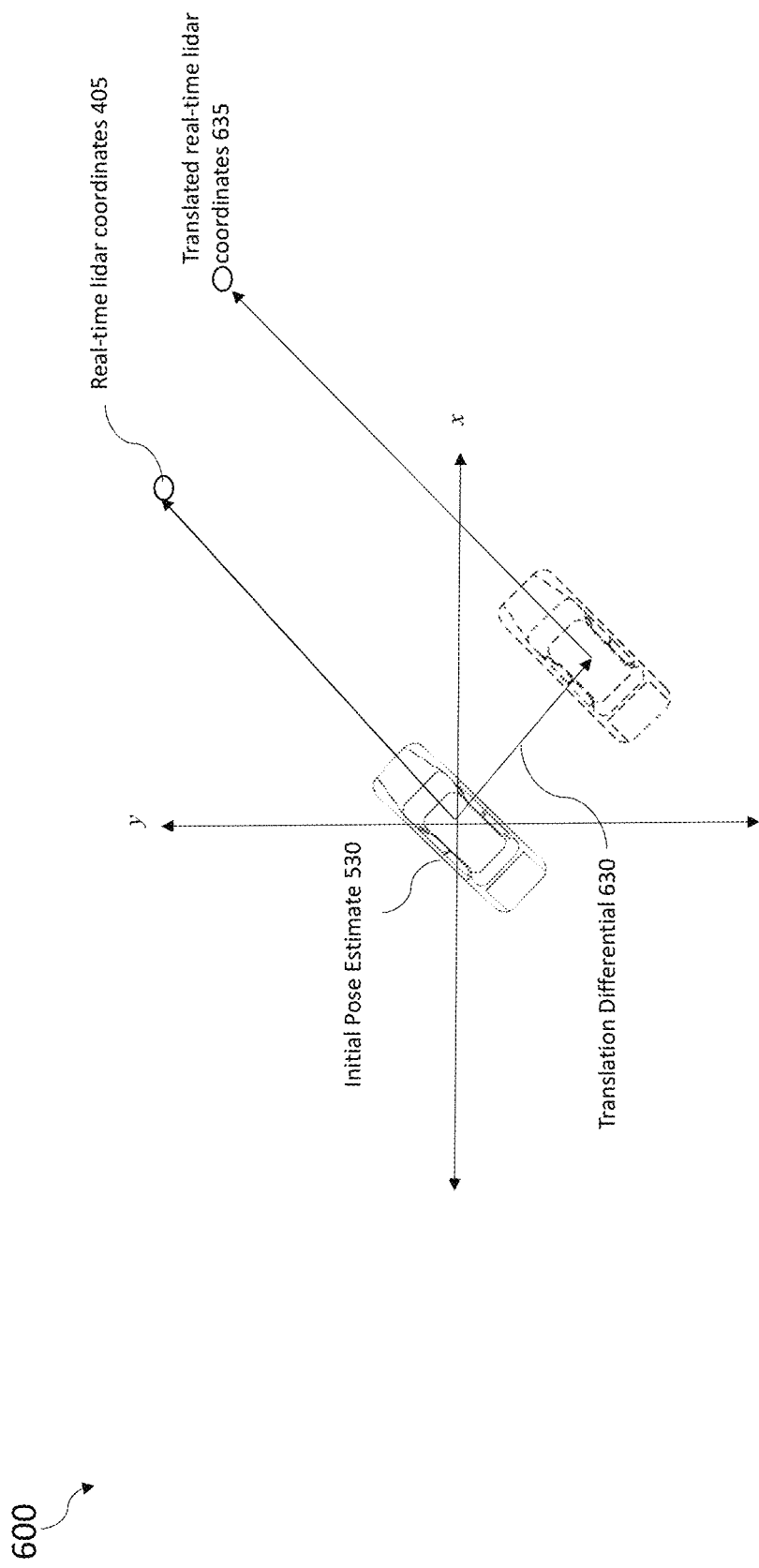
FIG. 6D illustrates an example of a 3D translation of an initial vehicle pose estimate, in accordance with aspects of the disclosure.

Additionally, vehicle on-board computing device 220 may translate query point cloud 430 to correct a translation misalignment between the query point cloud 430 and reference point cloud 510, as shown in FIG. 6D. The coordinates of autonomous vehicle 102 may need to be shifted based on a translation differential 630, which may be a translation vector representing the distance between initial pose estimate 530 and the pose estimate computed by the registration algorithm. Accordingly, vehicle on-board computing device 220 may translate the query point cloud 430 to reference point cloud 510 by shifting the query point cloud 430 in accordance with the translation differential 630.

Using the 3D translation and 3D rotation of query point cloud 430, vehicle on-board computing device 220 may concatenate the translation and rotation into a 4×4 transformation matrix, which enables vehicle on-board computing device 220 to reduce misalignment between query point cloud 430 and reference point cloud 510.

Figure 6E:
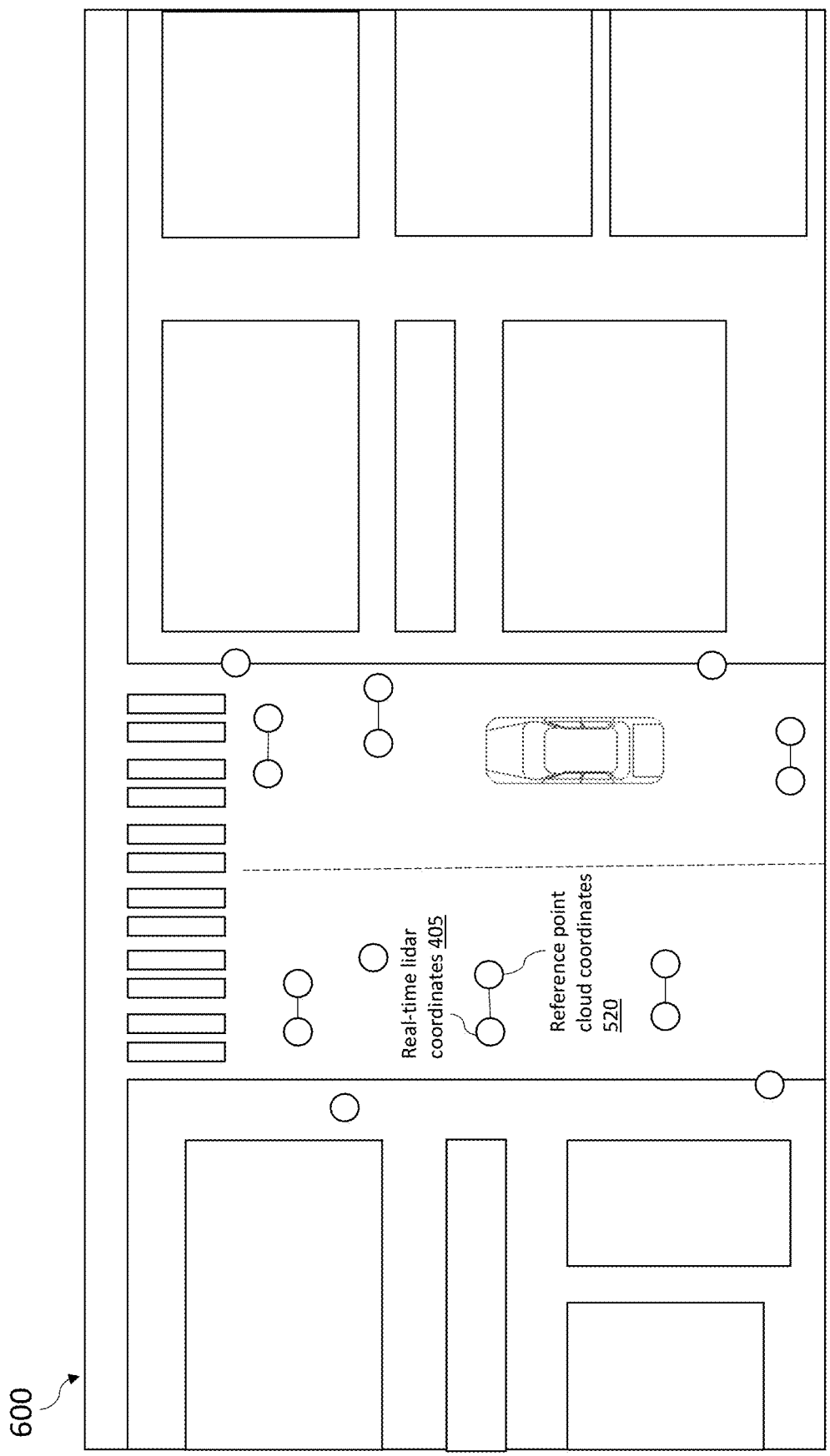
FIG. 6E illustrates an example of aligning a query point cloud and reference point cloud using a vehicle pose registration algorithm, in accordance with aspects of the disclosure.

On-board computing device 220 may use various registration algorithms (e.g., iterative closest point algorithm, robust point matching, etc.) to find an approximately accurate alignment between query point cloud 430 and reference point cloud 510. The registration algorithms may be configured to determine the optimal rotation and translation of reference point cloud 510. As shown in FIG. 6E for illustration purposes only, vehicle on-board computing device 220 may employ the iterative closest point algorithm to determine the optimal transformation matrix in order to minimize the distance between query point cloud 430 and reference point cloud 510. On-board computing device 220 may associate the reference point cloud coordinates 520 with the nearest real-time lidar coordinates 405 and converge the query point cloud 430 into reference point cloud 510.

To converge the query point cloud 430 into reference point cloud 510, vehicle on-board computing device 220 may solve for an optimal transformation matrix for query point cloud 430. On-board computing device 220 may compute the centroids for query point cloud 430 and reference point cloud 510 and compute a rotation matrix reflecting the distance between the query point cloud 430 and the reference point cloud 510. Using the optimal rotation matrix, vehicle on-board computing device 220 may obtain the optimal translation vector by aligning the centroids of the query point cloud 430 to the reference point cloud 510. On-board computing device 220 may repeat this process until query point cloud 430 and reference point cloud 510 converges. On-board computing device 220 may use any registration algorithm known to a person of ordinary skill in the art to align query point cloud 430 to reference point cloud 510.

Figure 7:
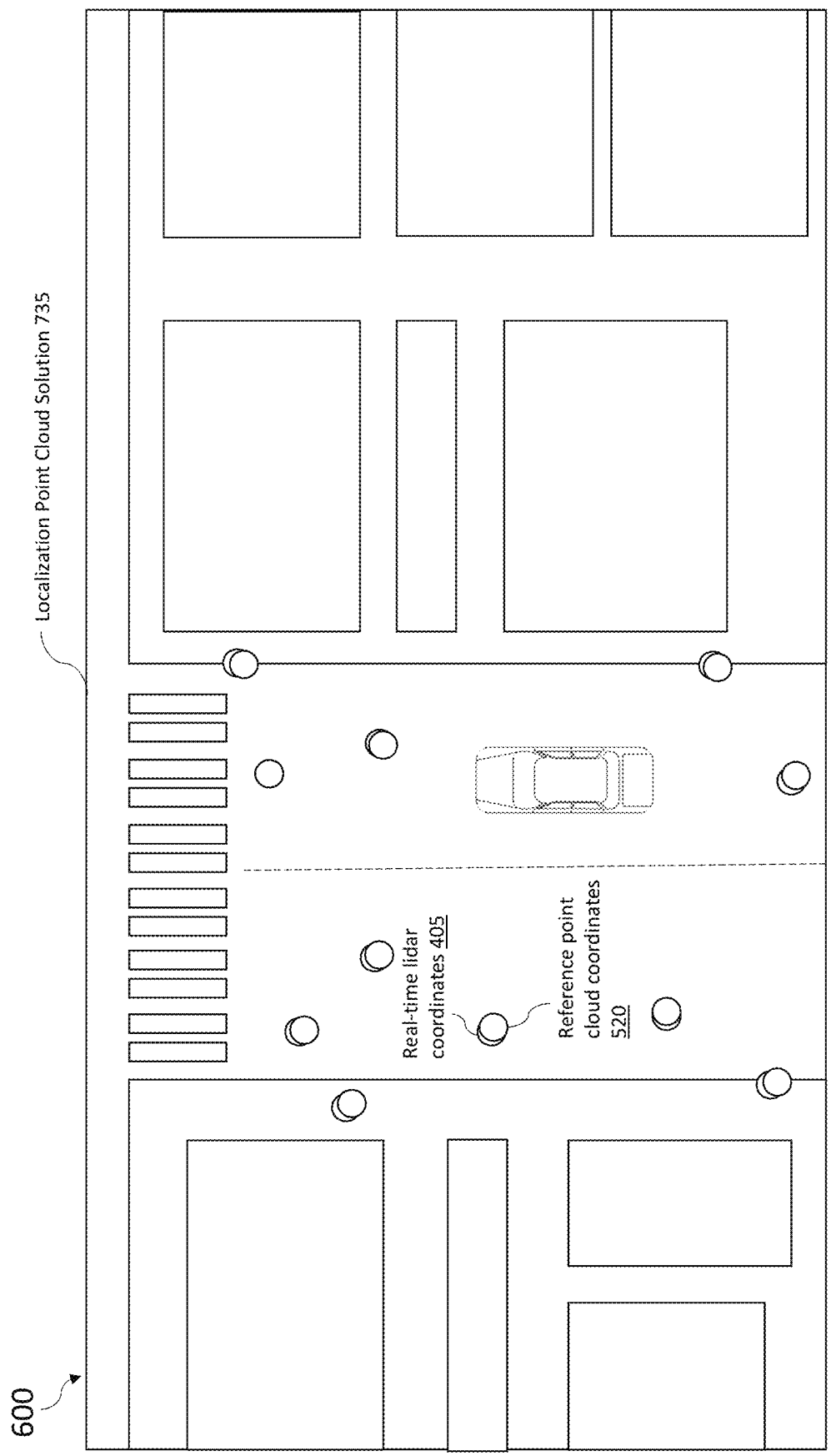
FIG. 7 illustrates an example of a localization point cloud solution, in accordance with aspects of the disclosure.

As a result, vehicle on-board computing device 220 may derive an optimal transformation matrix aligning reference point cloud 510 to query point cloud 430 and generate a refined 3D point cloud reflecting alignment between the query point cloud 430 and reference point cloud 510. The resulting refined 3D point cloud may be the localization point cloud solution 735 representing the registered autonomous vehicle pose. From a 2D perspective, the resulting localization point cloud solution 735 may represent alignment between query point cloud 430 and reference point cloud 510. As shown in FIG. 7, the real-time lidar coordinates 405 and reference point cloud coordinates 520 are approximately aligned, which may reflect a valid localization point cloud solution 735.

It is understood that errors in autonomous vehicle localization solutions may occur, in accordance with aspects of the disclosure. In an embodiment, high-definition map 505 may represent the surroundings of autonomous vehicle 102 with centimeter level accuracy. Moreover, legacy autonomous vehicle systems utilize various registration algorithms, such as the iterative closest point algorithm, to refine an initial pose estimate 530 retrieved from satellite data with real-time lidar coordinates 405. However, legacy registration algorithms may produce misaligned pose solution for an autonomous vehicle pose depending on the configuration parameters of the registration algorithm.

For example, a rotation error may result in a refined localization point cloud solution 735. In this example, the autonomous vehicle system may utilize an iterative closest point algorithm to align a query point cloud 430 and reference point cloud 510. However, the resulting localization point cloud solution 735 may contain a rotation error, in which the yaw angle 615 rotation of the query point cloud 430 was inaccurate by approximately 180 degrees. In another example, an error in the initial pose estimate 530 may occur due to an occlusion, such as a bush. This error may result in an inaccurate depiction of the surroundings of autonomous vehicle 102 in localization point cloud solution 735.

To provide an additional check to autonomous vehicle pose validation, human operators have reviewed a 2D or 3D representation of a localization point cloud solution 735 to determine the validity of an autonomous vehicle pose. In some embodiments, vehicle on-board computing device 220 may generate an autonomous vehicle pose solution from a 2D perspective based on query point cloud 430 and reference point cloud 510. On-board computing device 220 may generate a lidar frame 605 representing a 2D frame of the query point cloud 430 at the time stamp when lidar system 264 collected the real-time lidar coordinates 405 and lidar information and a standardized global map frame 610 representing a 2D frame of reference point cloud 510. On-board computing devices may overlay the 2D representation of the standardized global map frame 610 on lidar frame 605. A human operator may view the two frames from a top-down 2D perspective to determine whether the autonomous vehicle pose is valid.

However, this approach may result in human error to autonomous vehicle localization. A human operator may not always recognize false positives in localization point cloud solution 735 and may inaccurately validate an invalid autonomous vehicle pose. If a human operator does not recognize the false positive in the localization point cloud solution 735 and places the autonomous vehicle 102 in autonomous mode, this may result in dangerous ramifications, such as, placing the autonomous vehicle in the wrong lane. Therefore, a technical solution is needed to automate autonomous vehicle pose validation.

Figure 8A:
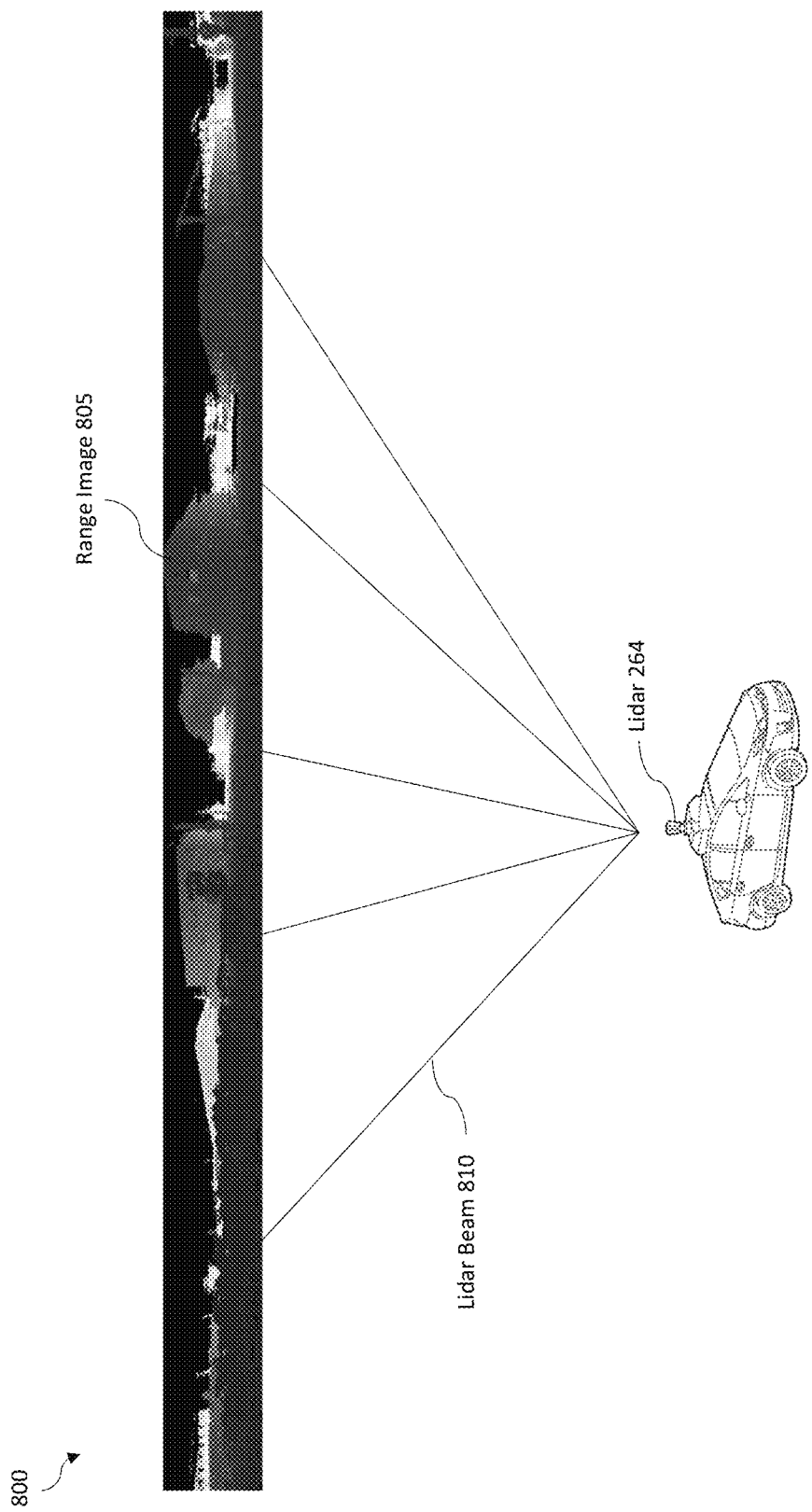
FIG. 8A is an example of a range image used for automated autonomous vehicle pose validation, in accordance with aspects of the disclosure.

FIG. 8A is an example of a range image used for automated autonomous vehicle pose validation, in accordance with aspects of the disclosure. Various autonomous vehicle localization algorithms have been developed to register an autonomous vehicle pose estimate. While these algorithms have improved autonomous vehicle localization, localization point cloud solution 735 may still result in alignment errors and still requires further validation from a human operator. On-board computing device 220 may automate validation of an autonomous vehicle pose estimate in localization point cloud solution 735 using statistical and machine learning methods. The use of these methods may significantly reduce the incorrect validation of false positive localization solutions produced from legacy registration algorithms and human error.

On-board computing device 220 may automate validation of the vehicle pose by generating a range image 805 from the refined localization point cloud solution 735. On-board computing device 220 may determine whether the localization point cloud solution 735 accurately estimates the autonomous vehicle pose by determining whether the data retrieved from range image 805 approximately represents observed values and data retrieved from real-time lidar sweep 410. On-board computing device 220 may use 3D projection techniques known to a person of ordinary skill in the art to render range image 805 from localization point cloud solution 735. On-board computing device 220 may categorize various features extracted from range image 805 with a predicted class label 815. For example, predicted class label 815 may include labels for features, such as, but not limited to, ground, road, sidewalk, building, wall fence, bridge, tunnel, pole, traffic light, traffic sign, vegetation, terrain, etc. On-board computing device 220 may extract a predicted range 820 corresponding to a predicted class label 815 for each lidar beam 810.

For purposes of illustration, vehicle on-board computing device 220 may use a rasterization rendering technique to generate range image 805. On-board computing device 220 may retrieve map tiles from localization point cloud solution 735 within a specified range of the vehicle pose estimate.

Each map tile from localization point cloud solution 735 may include a data structure (e.g., k-d tree) for organizing coordinates into a point cloud. On-board computing device 220 may use the data stored in the data structure for each map tile into a lidar coordinate system. Lidar system 264 may project the coordinates from localization point cloud solution 735 into range image 805. On-board computing device 220 may create a square surfel for the coordinates from localization point cloud solution 735 and may project each square surfel as two triangles into range image 805. On-board computing device 220 may rasterize the triangles in range image 805.

On-board computing device 220 may encode each rasterized triangle in range image 805 with values of the predicted range 820 for each lidar beam 810 projected from lidar system 264 to the coordinates in localization point cloud solution 735 and the corresponding predicted class label 815 in range image 805 using image space algorithms (e.g., depth buffer method). Therefore, vehicle on-board computing device 220 may retrieve the predicted range 820 and corresponding predicted class label 815 for each lidar beam 810 from range image 805 and the observed range 415 for each lidar beam from the real-time lidar sweep 410.

On-board computing device 220 may validate the localization point cloud solution 735 using the predicted range 820, predicted class label 815, and observed range 415 for each lidar beam. For each lidar beam 810, vehicle on-board computing device 220 may identify localization spherical coordinates 825 corresponding to the ratio between the predicted range 820 and observed range 415. The localization spherical coordinates 825 for the ratio between the predicted range 820 to the observed range 415 may be represented as follows P(azimuth angle 425, pitch angle 620, predicted range 820/observed range 415). These localization spherical coordinates 825 may represent a unit sphere.

Ideally, the ratio between the predicted range 820 and observed range 415 for each of the localization spherical coordinates 825 should be approximately 1. Accordingly, ideal unit sphere 830 represents a unit sphere with an equal predicted range 820 and observed range 415. On-board computing device 220 may determine the validity of localization point cloud solution 735 depending on the percentage of localization spherical coordinates 825 remaining in the ideal unit sphere 830. When a certain percentage of localization spherical coordinates 825 fall outside the ideal unit sphere 830, the localization point cloud solution 735 may likely contain a rotation or translation error.

Figure 8C:
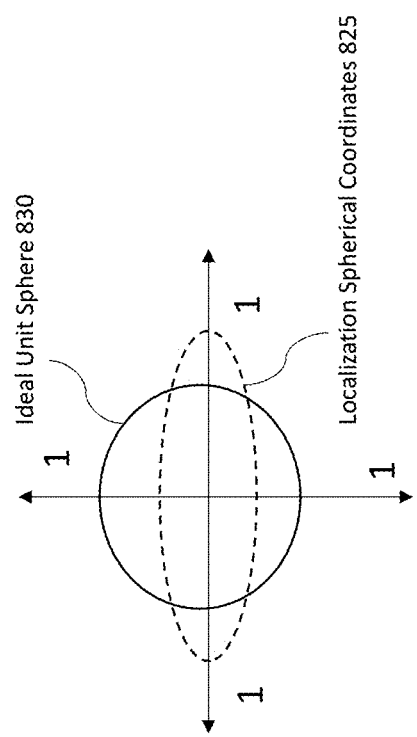
FIGS. 8B and 8C is an example of localization spherical coordinates corresponding to a rotation error in a localization point cloud solution, in accordance with aspects of the disclosure.
Figure 8B:
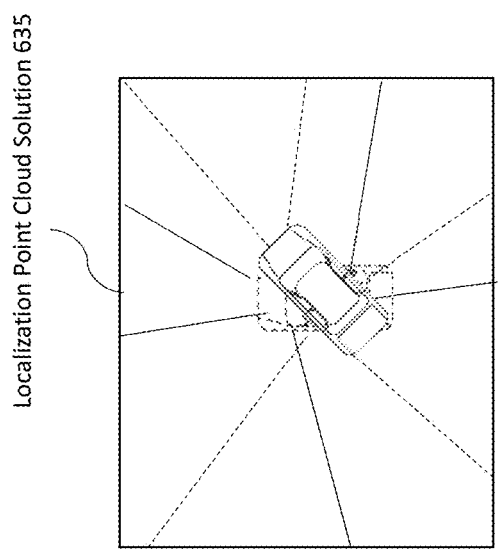
Figure 8D:
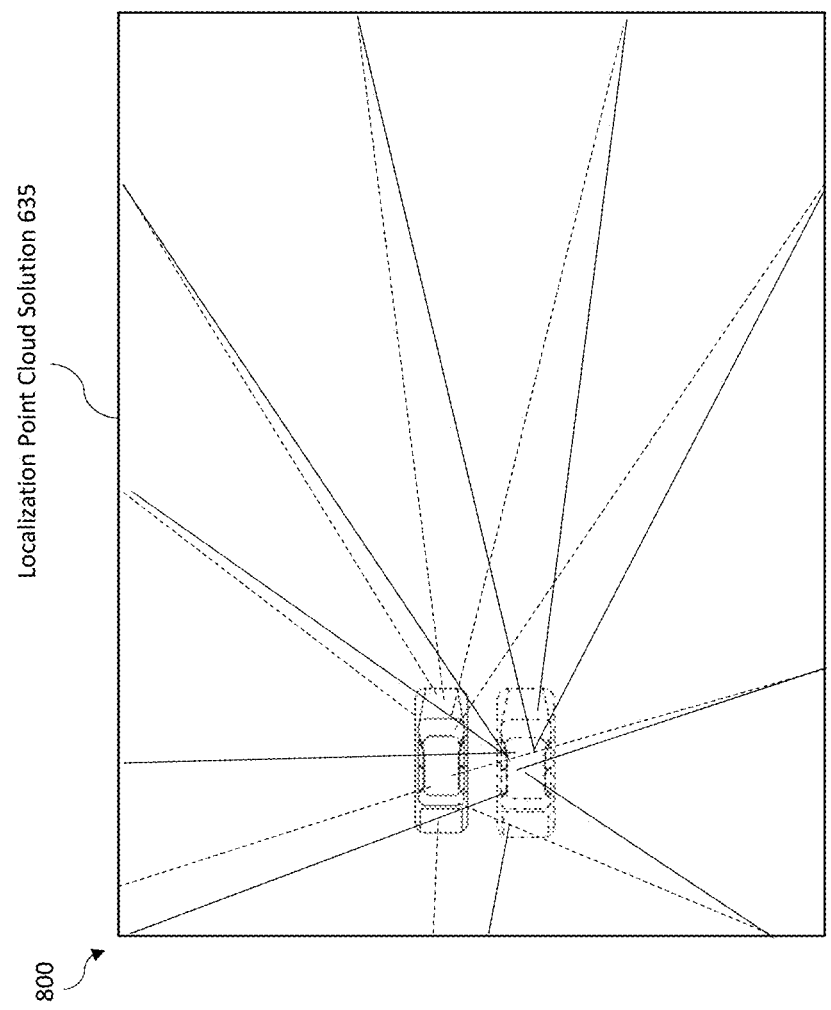
FIGS. 8D and 8E is an example of localization spherical coordinates corresponding to a translation error in a localization point cloud solution, in accordance with aspects of the disclosure.

For purposes of illustration, as shown in FIGS. 8B and 8D, localization point cloud solution 735 contains a rotation error and translation error. The query point cloud 430 generated from the real-time lidar sweep 410 represents a ground truth measurement of the real-time lidar coordinates 405, as depicted by the gray autonomous vehicle 102 and corresponding dotted lidar beams. In contrast, the black autonomous vehicle 102 and corresponding lidar beams represent the localization point cloud solution 735. The query point cloud 430 and localization point cloud solution 735 contains a rotation error, as reflected by the misaligned orientation of the gray autonomous vehicle 102 and black autonomous vehicle 102.

Figure 8E:
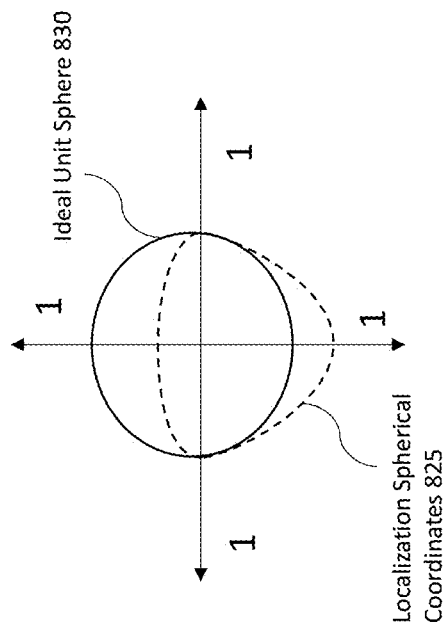

As shown in FIGS. 8C and 8E, the ideal unit sphere 830 representing the predicted ranges obtained from range image 805 corresponding to the observed ranges obtained from the ground truth measurements of the real-time lidar sweep 410. Ideally, the predicted range of the localization spherical coordinates 825 obtained from the range image 805 would equate to the observed range 415 obtained from the ground truth measurements, as depicted by ideal unit sphere 830. With an approximately accurate localization point cloud solution 735, the majority of the localization spherical coordinates 825 would remain within or on ideal unit sphere 830.

However, when a rotation error occurs, the localization spherical coordinates 825 fall outside the ideal unit sphere 830 and may form an ellipsoidal shape outside the ideal unit sphere 830, as shown in FIG. 8C. Similarly, when a translation error occurs, the localization spherical coordinates 825 fall outside the ideal unit sphere 830 and may form a cone shape outside the ideal unit sphere 830, as shown in FIG. 8E. If a majority of the localization spherical coordinates 825 fall outside the ideal unit sphere 830, this may indicate the localization point cloud solution 735 contains a rotation error or translation error. Accordingly, vehicle on-board computing device 220 may classify the localization point cloud solution 735 as a false positive. To determine whether the localization point cloud solution 735 is valid, vehicle on-board computing device 220 may set a threshold representing the percentage of localization spherical coordinates 835 that should remain within and on the ideal unit sphere 830 for the localization point cloud solution 735 to be classified as valid.

On-board computing device 220 may also use a binary classifier to determine whether a localization point cloud solution 735 is valid. On-board computing device 220 may identify the percentage of lidar beams 810 corresponding to each predicted class label 815. For example, vehicle on-board computing device 220 may identify what percentage of lidar beams 810 belong to predicted class labels, such as, ground, road, sidewalk, building, wall fence, bridge, tunnel, pole, traffic light, traffic sign, vegetation, terrain, etc. For each predicted class label 815, vehicle on-board computing device 220 may identify the percentage of observed ranges from real-time lidar sweep 410 that are shorter than, approximately equal to, and/or farther than the predicted range 820 for each lidar beam 810 projected into range image 805. This may be useful in situations when a particular feature, such as a wall, is predicted in the localization point cloud solution 735, but the observation range 415 from the autonomous vehicle 102 to the wall is farther than the predicted range 820.

Accordingly, vehicle on-board computing device 220 may create a probability distribution P(A, B) to determine a threshold for the percentage of coordinates from localization point cloud solution 735 with misaligned observed ranges and predicted ranges from particular features. The value A may represent the event whether the prediction range 820 is significantly longer than, shorter than, or approximately equal to the observation range 415. The value B may represent the predicted class label 815 of lidar beam 810. Using this probability distribution, vehicle on-board computing device 220 may use a binary classifier trainer (e.g., a random forest classifier or support vector machine) to determine whether localization point cloud solution 735 is valid. In some embodiments, on-board computing device 220 may set multiple thresholds using the binary classifier trainer to classify localization point cloud solution 735 as valid. For example, the threshold may be a percentage of prediction ranges in range image 805 that would need to be roughly longer than, shorter than or approximately equal to the observation range 415 based on the type of predicted class label 815.

Figure 9:
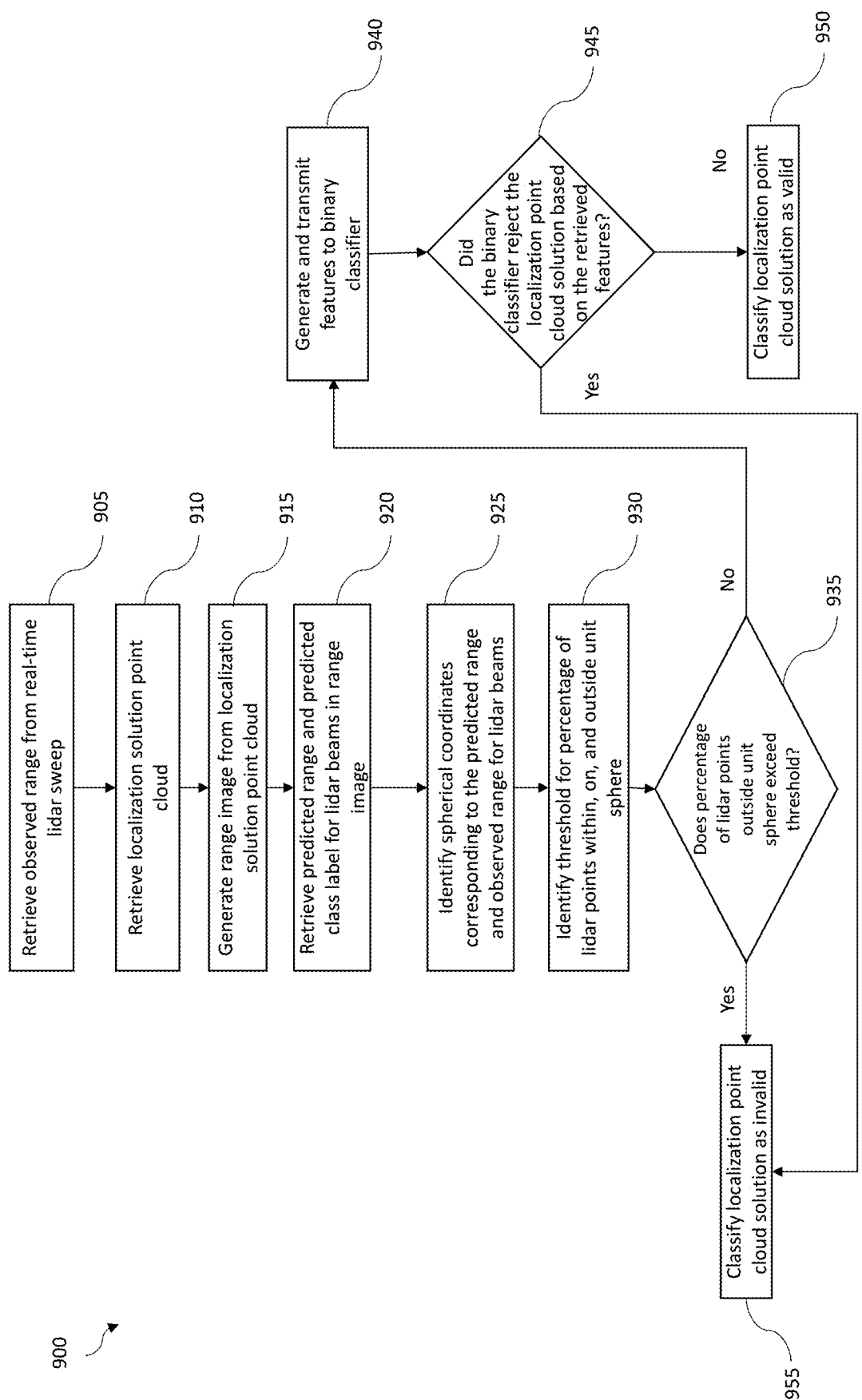
FIG. 9 is an example of a flowchart for automated autonomous vehicle pose validation, according to some embodiments.

FIG. 9 is a flowchart illustrating a method for automated autonomous vehicle pose validation, according to some embodiments. FIG. 9 is described with reference to FIGS.

1-8. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

At 905, vehicle on-board computing device 220 retrieves observed range 415 from real-time lidar sweep 410. On-board computing device 220 retrieves real-time lidar coordinates 405 from a real-time lidar sweep 410. Real-time lidar sweep 410 may consist of 3D spherical coordinates obtained from sensing the surroundings of autonomous vehicle 102, which may be represented as P(x, y, z). The 3D spherical coordinates may be comprised of an observed range (r) 415, an elevation angle ($\varphi$) 420, and an azimuth angle ($\theta$) 425. Observed range 415 represents the observed range between the light emitter system 304 and real-time lidar coordinates 405.

At 910, vehicle on-board computing device 220 retrieves localization point cloud solution 735. On-board computing device 220 generates a query point cloud 430, which represents the real-time lidar coordinates 405 retrieved from lidar system 264. On-board computing device 220 derives an initial pose estimate 530 in reference point cloud 510 using GPS information. On-board computing device 220 generates a localization solution point cloud 735 by aligning query point cloud 430 and the initial pose estimate 530 in reference point cloud 510. To align query point cloud 430 and reference point cloud 510, vehicle on-board computing device 220 computes a 3D rotation and 3D translation of query point cloud 430 and reference point cloud 510.

On-board computing device 220 derives an optimal transformation matrix aligning reference point cloud 510 to query point cloud 430 and generate a refined 3D point cloud reflecting alignment between the query point cloud 430 and reference point cloud 510. The resulting refined 3D point cloud may be the localization point cloud solution 735 representing the registered autonomous vehicle pose. From a 2D perspective, the resulting localization point cloud solution 735 may represent alignment between query point cloud 430 and reference point cloud 510.

At 915, vehicle on-board computing device 220 generates a range image 805 from localization point cloud solution 735. On-board computing device 220 may use 3D projection techniques known to a person of ordinary skill in the art to render range image 805 from localization point cloud solution 735. According to some embodiments, vehicle on-board computing device 220 may retrieve map tiles from localization point cloud solution 735 within a specified range of the vehicle pose estimate. Each map tile from localization point cloud solution 735 may include a data structure for organizing coordinates into a point cloud. On-board computing device 220 may use the data stored in the data structure for each map tile into a lidar coordinate system. Lidar system 264 may project the coordinates from localization point cloud solution 735 into range image 805. On-board computing device 220 may create a square surfel for the coordinates from localization point cloud solution 735 and may project each square surfel as two triangles into range image 805. On-board computing device 220 may rasterize the triangles in range image 805.

At 920, vehicle on-board computing device 220 may retrieves the predicted range 820 and predicted class label 915 for the lidar beams 810 in range image 805. On-board computing device 220 may categorize various features extracted from range image 805 with a predicted class label 815. For example, predicted class label 815 may include labels for features, such as, but not limited to, ground, road, sidewalk, building, wall fence, bridge, tunnel, pole, traffic light, traffic sign, vegetation, terrain, etc. On-board computing device 220 may extract a predicted range 820 corresponding to a predicted class label 815 for each lidar beam 810.

On-board computing device 220 encodes each rasterized triangle in range image 805 with values of the predicted range 820 for each lidar beam 810 projected from lidar system 264 to the coordinates in localization point cloud solution 735 and the corresponding predicted class label 815 in range image 805 using image space algorithms (e.g., depth buffer method). Therefore, vehicle on-board computing device 220 may retrieve the predicted range 820 and corresponding predicted class label 815 for each lidar beam 810 from range image 805 and the observed range 415 for each lidar beam from the real-time lidar sweep 410.

At 925, vehicle on-board computing device 220 determines localization spherical coordinates 825 corresponding to the ratio between the predicted range 820 and observed range 415. The localization spherical coordinates 825 for the ratio between the predicted range 820 to the observed range 415 may be represented as follows P(azimuth angle 425, pitch angle 620, predicted range 820/observed range 415). These localization spherical coordinates 825 may represent a unit sphere.

At 930, vehicle on-board computing device 220 determines a threshold for the percentage of localization spherical coordinates 825 that may fall outside the ideal unit sphere 830. Ideally, the ratio between the predicted range 820 and observed range 415 for each of the localization spherical coordinates 825 may be approximately 1. Accordingly, ideal unit sphere 830 represents a unit sphere with an equal predicted range 820 and observed range 415. With an approximately accurate localization point cloud solution 735, the majority of the localization spherical coordinates 825 would remain within or on ideal unit sphere 830.

On-board computing device 220 establishes a threshold for the localization point cloud solution 735 to be classified as valid based on the localization spherical coordinates 825. In some embodiments, the threshold may be the percentage of localization spherical coordinates 825 that can fall outside the ideal unit sphere 830. On-board computing device 220 may use machine learning techniques known to a person of ordinary skill in the art to determine the percentage of localization spherical coordinates 825 that would approximately classify localization point cloud solution 735 as valid.

At 935, vehicle on-board computing device 220 determines whether each of the localization spherical coordinates 825 falls within, on, or outside ideal unit sphere 830. On-board computing device 220 determines the percentage of localization spherical coordinates 825 that fall within, on, or outside ideal unit sphere 830. On-board computing device 220 determines whether the percentage of localization spherical coordinates 825 falling outside the ideal unit sphere 830 exceeds the threshold. If the percentage of localization spherical coordinates 825 outside the ideal unit sphere 830 exceeds the threshold, method 900 proceeds to 955. If the percentage of localization spherical coordinates 825 outside the ideal unit sphere 830 does not exceed the threshold, method 900 proceeds to 940.

At 940, vehicle on-board computing device 220 generates and transmits features to a binary classifier. Vehicle on-board computing device 220 generates a vector of features based on features detected in range image 805. Vehicle on-board computing device 220 may establish a threshold for the percentage of features in range image 805 that may be marked as outliers for the localization point cloud solution 735 to be classified as valid. On-board computing device 220 may create a probability distribution P(A, B) to determine a threshold for the percentage of coordinates from localization point cloud solution 735 with misaligned observed ranges and predicted ranges from particular features. The value A may represent the event whether the prediction range 820 is significantly longer than, shorter than, or approximately equal to the observation range 415. The value B may represent the predicted class label 815 of the lidar beam 810.

Using this probability distribution, vehicle on-board computing device 220 may use a binary classifier trainer (e.g., a random forest classifier or support vector machine) to determine whether localization point cloud solution 735 is valid. In some embodiments, vehicle on-board computing device 220 may optionally establish a threshold for the binary classifier. The threshold may be a percentage of prediction ranges in range image 805 that would need to be roughly longer than, shorter than or approximately equal to the observation range 415 based on the type of predicted class label 815.

At 945, vehicle on-board computing device 220 retrieves a solution from the binary classifier indicating whether localization point cloud solution 735 is rejected based on the features transmitted to binary classifier. Vehicle on-board computing device 220 may identify the percentage of lidar beams 810 corresponding to each predicted class label 815. For example, vehicle on-board computing device 220 identifies what percentage of lidar beams 810 belong to predicted class labels, such as, ground, road, sidewalk, building, wall fence, bridge, tunnel, pole, traffic light, traffic sign, vegetation, terrain, etc. For each predicted class label 815, vehicle on-board computing device 220 determines whether the predicted range 820 from range image 805 is farther than, approximately equal to, and/or farther than the observed range 415. The binary classifier determines whether a localization point cloud solution should be rejected based on the retrieved vector of features.

In some embodiments, vehicle on-board computing device 220 may use a single or multiple thresholds to determine whether the localization point cloud solution 735 should be rejected, though it is not required. For example, on-board computing device 220 may identify the percentage of observed ranges from real-time lidar sweep 410 that are shorter than, approximately equal to, and/or farther than the predicted range 820 for each lidar beam 810 projected into range image 805. On-board computing device 220 determines which predicted ranges in range image 805 are outliers based on an established distance between predicted range 820 and observed range 415.

If the binary classifier rejected the solution based on the retrieved features, method 900 proceeds to 955. If the binary classifier accepted the solution based on the retrieved features, method 900 proceeds to 950.

At 950, vehicle on-board computing device 220 validates localization point cloud solution 735.

At 955, vehicle on-board computing device 220 classifies localization point cloud solution 735 as invalid.

Figure 10:
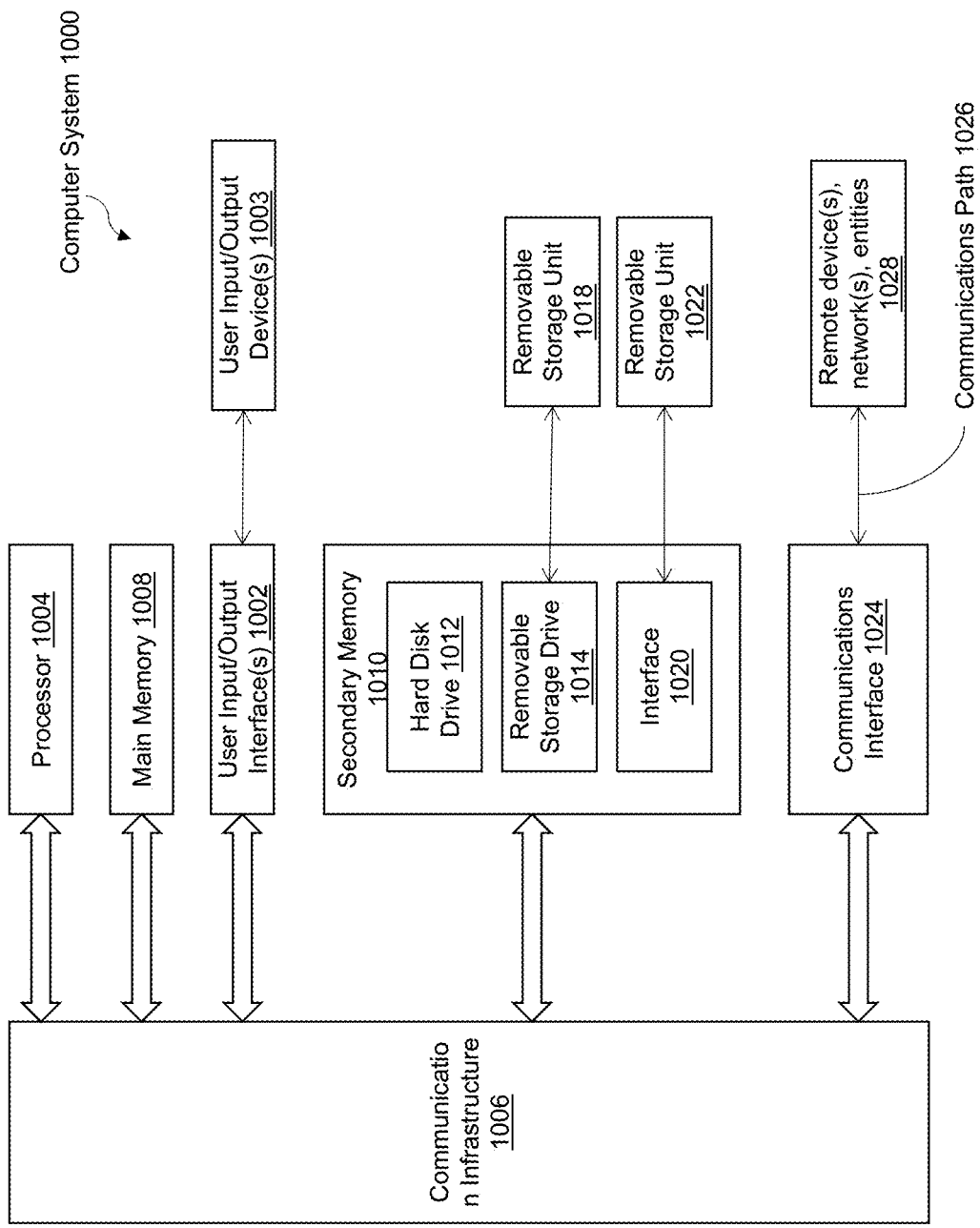
FIG. 10 is an example computer system useful for implementing various embodiments.

Various embodiments can be implemented, for example, using one or more computer systems, such as computer system 1000 shown in FIG. 10. FIG. 10 is described with reference to FIGS. 1-9. Computer system 1000 can be used, for example, to implement method 900 of FIG. 9. For example, computer system 1000 can implement and execute a set of instructions comprising generating range image from localization point cloud solution 735, querying lidar beams 810 projected into range image 805 for a corresponding predicted class label 815 and predicted range 820, comparing predicted range 820 and predicted class label 815 to the observed range 415 from real-time lidar sweep 410, and validating the localization point cloud solution 735. Computer system 1000 can be any computer capable of performing the functions described herein.

Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible, non-transitory computer usable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   estimating a pose for an autonomous vehicle based on features extracted from a reference point cloud as compared to semantic features representing surroundings of the autonomous vehicle, wherein the reference point cloud represents data from a plurality of lidar sweeps and is extracted from a high-definition map;
   validating the pose estimate as a pose of the autonomous vehicle based on first coordinates derived from a query point cloud generated from a real-time lidar sweep of the surroundings evaluated against second coordinates derived from the reference point cloud by at least one of: aligning the first coordinates with the second coordinates, identifying difference between the first coordinates and the second coordinates, or merging the first coordinates with the second coordinates; and
   causing the autonomous vehicle to perform a driving maneuver based on the validated pose estimate.

2. The method of claim 1, wherein the features extracted from the reference point cloud are based on predicted light pulse distance ranges corresponding to lidar beams from the plurality of lidar sweeps.

3. The method of claim 1, further comprising invalidating, based on third coordinates derived from another query point cloud generated from another real-time lidar sweep of the environment evaluated against fourth coordinates derived from the reference point cloud, another pose estimate as another pose of the autonomous vehicle.

4. The method of claim 3, wherein the third coordinates derived from the another query point cloud evaluated against the fourth coordinates derived from the reference point cloud indicates a misalignment of the third coordinates and the fourth coordinates.

5. The method of claim 3, wherein the another pose estimate is at least one of: received from a global positioning system (GPS), or derived from GPS data.

6. The method of claim 1, wherein the features extracted from the reference point cloud are compared to the semantic features representing the surroundings of the autonomous vehicle by a binary classifier of the autonomous vehicle.

7. A system, comprising:
   a memory; and
   at least one processor coupled to the memory and configured to perform operations comprising:
   estimating a pose for an autonomous vehicle based on features extracted from a reference point cloud as compared to semantic features representing surroundings of the autonomous vehicle, wherein the reference point cloud represents data from a plurality of lidar sweeps and is extracted from a high-definition map; and validating the pose estimate as a pose of the autonomous vehicle based on first coordinates derived from a query point cloud generated from a real-time lidar sweep of the surroundings evaluated against second coordinates derived from the reference point cloud by at least one of: aligning the first coordinates with the second coordinates, identifying difference between the first coordinates and the second coordinates, or merging the first coordinates with the second coordinates; and causing the autonomous vehicle to perform a driving maneuver based on the validated pose estimate.

8. The system of claim 7, wherein the features extracted from the reference point cloud are based on predicted light pulse distance ranges corresponding to lidar beams from the plurality of lidar sweeps.

9. The system of claim 7, the operations further comprising invalidating, based on third coordinates derived from another query point cloud generated from another real-time lidar sweep of the environment evaluated against fourth coordinates derived from the reference point cloud, another pose estimate as another pose of the autonomous vehicle.

10. The system of claim 9, wherein the third coordinates derived from the another query point cloud evaluated against the fourth coordinates derived from the reference point cloud indicates a misalignment of the third coordinates and the fourth coordinates.

11. The system of claim 9, wherein the another pose estimate is at least one of: received from a global positioning system (GPS), or derived from GPS data.

12. The system of claim 7, wherein the features extracted from the reference point cloud are compared to the semantic features representing the surroundings of the autonomous vehicle by a binary classifier of the autonomous vehicle.

13. A non-transitory computer-readable medium having instructions stored thereon that, when executed by at least one computing device, cause the at least one computing device to perform operations comprising:

estimating a pose for an autonomous vehicle based on features extracted from a reference point cloud as compared to semantic features representing surroundings of the autonomous vehicle, wherein the reference point cloud represents data from a plurality of lidar sweeps and is extracted from a high-definition map; and validating the pose estimate as a pose of the autonomous vehicle based on first coordinates derived from a query point cloud generated from a real-time lidar sweep of the surroundings evaluated against second coordinates derived from the reference point cloud by at least one of: aligning the first coordinates with the second coordinates, identifying difference between the first coordinates and the second coordinates, or merging the first coordinates with the second coordinates; and causing the autonomous vehicle to perform a driving maneuver based on the validated pose estimate.

14. The non-transitory computer-readable medium of claim 13, wherein the features extracted from the reference point cloud are based on predicted light pulse distance ranges corresponding to lidar beams from the plurality of lidar sweeps.

15. The non-transitory computer-readable medium of claim 13, the operations further comprising invalidating, based on third coordinates derived from another query point cloud generated from another real-time lidar sweep of the environment evaluated against fourth coordinates derived from the reference point cloud, another pose estimate as another pose of the autonomous vehicle.

16. The non-transitory computer-readable medium of claim 15, wherein the third coordinates derived from the another query point cloud evaluated against the fourth coordinates derived from the reference point cloud indicates a misalignment of the third coordinates and the fourth coordinates.

17. The non-transitory computer-readable medium of claim 15, wherein the another pose estimate is at least one of: received from a global positioning system (GPS), or derived from GPS data.

* * * * *